April 21, 1970 J. L. CANNELLA 3,507,542
ELECTRICAL TRAILER BRAKE SYSTEM
Filed Nov. 12, 1968
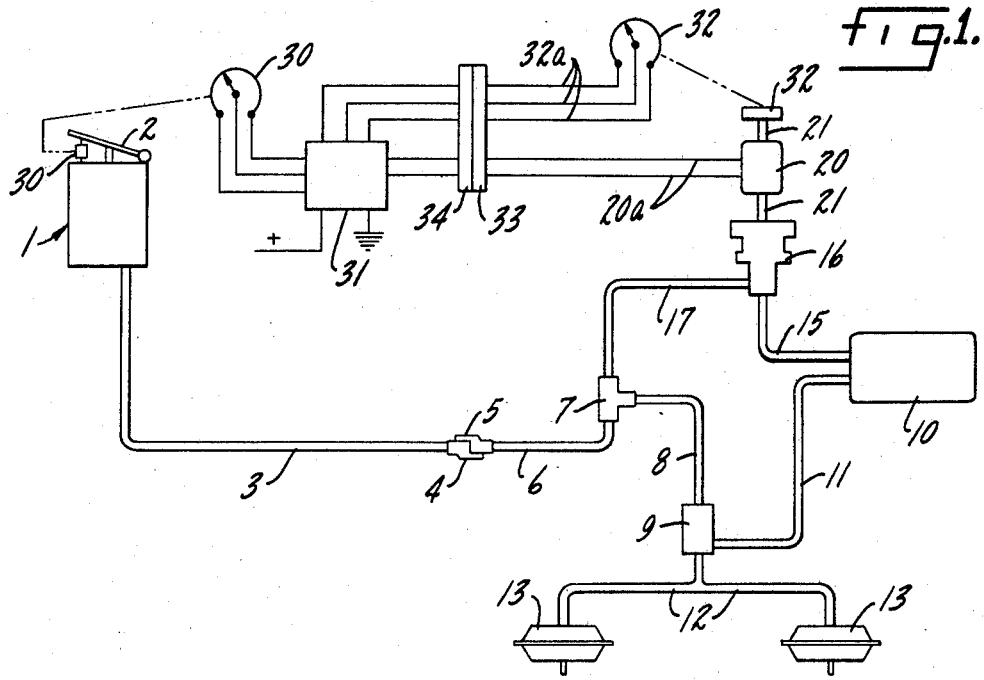
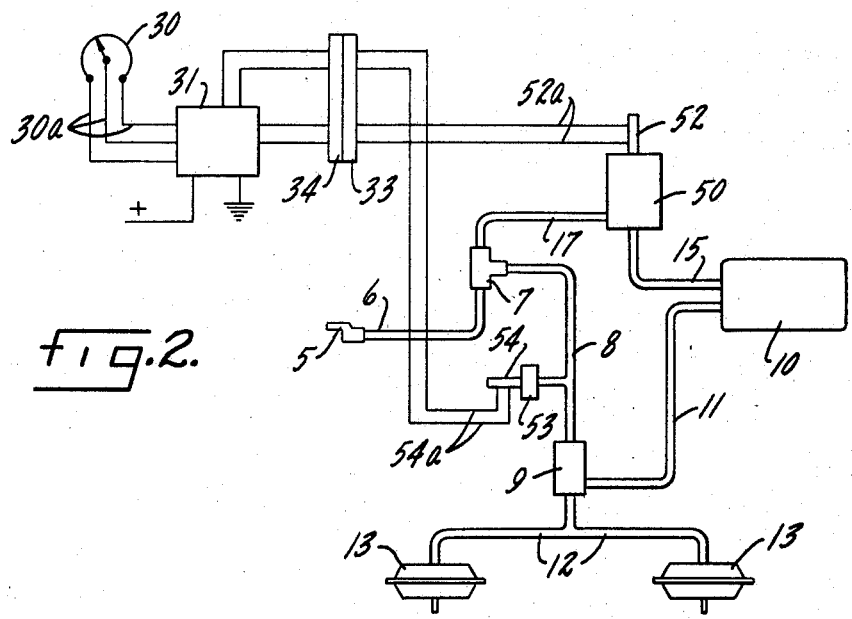
INVENTOR.
Joseph L. Cannella
BY Parker, Carter & Markey
Attorneys.

United States Patent Office 3,507,542
Patented Apr. 21, 1970

3,507,542
ELECTRICAL TRAILER BRAKE SYSTEM
Joseph L. Cannella, Melrose Park, Ill., assignor to Berg Mfg. & Sales Co., Des Plaines, Ill., a corporation of Illinois
Filed Nov. 12, 1968, Ser. No. 774,649
Int. Cl. B60t 13/68
U.S. Cl. 303—7
9 Claims

ABSTRACT OF THE DISCLOSURE

A trailer brake system incorporating an electrical signal generating mechanism responsive to tractor brake application to direct a signal to the trailer brake system and to initiate application of fluid pressure to the trailer brakes in response to said signal, the signal generating system including master and slave elements on the tractor and trailer and a differential amplifier providing for minute, close control of pressures supplied to the trailer system and of pressure relationships on tractor and trailer.

SUMMARY OF THE INVENTION

A tractor-trailer brake system wherein a master control is operated in response to application of tractor brakes and is effective to supply electrical energy to the trailer brake system for rapid application of fluid pressure to the trailer brake system. The invention includes electrical control means on the trailer slaved to the master control means on the tractor and a differential amplifier between said means and effective to provide for minute control applications and incremental variations. The slave system may incorporate feedback elements effective to read valve positions, torque motor positions or pressures in the variant forms of the invention. The application of fluid pressure to the trailer brake system is controlled in relation to amperage, rather than voltage for increased accuracy. The system of the invention is substantially free of temperature influence and incorporates fail-safe considerations whereby availability of braking pressure to the trailer brake system is insured.

This invention relates to tractor-trailer vehicle brake systems.

Application of the vehicle brakes by the operator in the tractor is accomplished by manual actuation of a brake pedal. The time required for fluid pressure to fill the system back to the trailer results in application of trailer brakes at a time substantially after the brakes have been applied to the tractor, since the air pressure conduits to the trailer brakes are substantially longer than those to the tractor brakes. Delayed application of trailer brakes results in a tendency toward jackknifing of the trailer and tractor. The problem is further complicated when a "train" vehicle incorporating a second trailer is considered. Accordingly it is one purpose of the invention to provide means tending to speed the application of trailer brakes and to reduce said tendency toward jackknifing.

Another purpose is to provide a brake system incorporating means means for minute, assured control of fluid pressure delivered to the trailer brakes prior to arrival thereof of service brake pressure from the tractor system.

Another purpose is to provide means speeding the application of trailer brakes, which means shall be substantially free of temperature influences.

Another purposes is to provide means speeding the application of trailer brakes, which means shall include fail-safe provisions insuring availability of braking pressure to the trailer under circumstances in which said means may be ineffective.

Another purpose is to provide means effective to control fluid pressure delivered to the trailer brakes in relation to amperage.

Another purpose is to provide means delivering accurate, controlled amounts of fluid pressure to the trailer brakes prior to delivery of service pressure to the trailer brake system.

Another purpose is to provide means speeding application of fluid pressure to trailer brakes in response to an electrical signal and incorporating feedback means.

Another purpose is to provide means speeding application of fluid pressure to the trailer brakes and incorporating master control elements on the tractor and slave control elements on the trailer.

Another purpose is to provide means speeding application of fluid pressure to the trailer brakes and including feedback means responsive to valve positions, torque motor shaft positions, incremental motor positions or fluid pressures.

Other purposes will appear from time to time during the course of the specification and claims.

BRIEF DESCRIPTION OF THE DRAWINGS

The invention is illustrated, more or less diagrammatically in the accompanying drawings wherein:

FIGURE 1 is a schematic plan view illustrating one form of the system of the invention; and FIGURE 2 is a schematic plan view illustrating a variant form of the invention.

Like parts are indicated by like numerals throughout the specification and drawings.

DESCRIPTION OF THE PREFERRED EMBODIMENT

Referring now to the drawings, the numeral 1 generally designates a tractor brake application valve. The valve 1, as is well known, may be conveniently operated by means of brake pedal 2. Since the application valve 1 and pedal 2 may take a variety of conventional forms, without departing from the nature and scope of the invention, they are not shown in greater detail in the drawings and need not be further described. It will be understood that the application valve 1 is supplied with fluid pressure from a source carried on the tractor and that said fluid pressure is delivered through a service conduit 3 to a gladhand connector 4. A corresponding gladhand connector 5 is carried on the trailer and is connected to the trailer service line conduit 6, which in turn communicates with one inlet of a two-way check valve 7.

The outlet of valve 7 communicates through a conduit 8 with the area above the service piston (not shown) within a conventional relay emergency valve 9. A fluid pressure reservoir or source 10 is carried on the trailer and communicates through a conduit 11 with the relay emergency valve 9, it being understood that fluid pressure supplied from source 10 through conduit 11 to relay emergency valve 9 is delivered therethrough to brake lines 12 in response to actuation of valve 9 by pressure received from conduit 8. The brake lines 12 supply fluid pressure to brake actuating cylinders 13 to apply the trailer brakes.

In accordance with the invention, the trailer pressure source 10 is communicated, through a conduit such as that shown at 15, for example, with a modulation valve 16. A conduit 17 communicates the valve 16 with the other inlet of two-way check valve 7. As shown in FIGURE 1, the valve 16 is connected for operation by a servomotor 20, the motor shaft 21 being provided, for example, for this purpose.

An electrical signal generator, such as the potentiometer 30, is mounted on the tractor for actuation in response to movement of brake pedal 2. The master potentiometer 30 is connected by suitable electrical conductors to a differential amplifier 31, which is illustrated as being carried by the tractor. The differential amplifier 31 is shown schematically and not in detail since the same is well known to those skilled in the art as being effective to determine and alleviate differences in signals received thereby.

A slave potentiometer 32 is connected for actuation by motor shaft 21 of motor 20 on the trailer. Suitable electrical conductors connect the potentiometer 32 to the amplifier 31, suitable crossbars or electrical connector elements 33, 34 being provided for connection between the tractor and trailer. It will be observed that potentiometer 30 is connected to amplifier 31 by suitable conductors 30a. Potentiometer 32 is connected to amplifier 31 by suitable conductors 32a. The motor 20 is connected to amplifier 31 by suitable conductors 20a. The motor 20 may take the form of an incremental motor.

Referring now to FIGURE 2, it will be observed that an electrically operated valve 50 is supplied with fluid pressure from trailer reservoir 10 through conduit 15, the parts shown in FIGURE 2 and corresponding to parts shown in FIGURE 1 being supplied with identical numbers for clarity. Conduit 17 connects valve 50 with an inlet of two-way check valve 7. The electrically operated valve 50 may conveniently take the form of an electromagnetic or solenoid valve, the solenoid being indicated generally at 52 and being connected through connectors 33, 34 with the amplifier 31 by conductors 52a. A pressure-responsive member 53 communicates with conduit 8 between valves 7 and 9 for operation of a field effect coil 54 which is in turn connected through connectors 33, 34 to the amplifier 31 by conductors 54a.

It will be understood that pressure-responsive member 53 may take a variety of conventional forms wherein a diaphragm or piston is exposed on one side to the fluid pressure within conduit 8 and is operatively connected at its other side with an armature within the field coil 54. Similarly, the valve 50 may take a variety of forms wherein a valve member normally closes communication between conduits 15 and 17 and is opened in response to supply of electrical energy to solenoid 52.

The use and operation of the invention are as follows:

Upon actuation of pedal 2 by the vehicle operator, the potentiometer 30 will be positioned. It will be understood that provision may be made for initial movement of pedal 2 through a relatively minute portion of its traverse prior to actuation of the potentiometer 30 when it is desired to preclude supply of fluid pressure to the trailer brake system in the event of such minute initial movement of pedal 2.

As pedal 2 is normally moved, brake application valve 1 is effective to supply fluid pressure to the tractor brakes (not shown) through the relatively short brake pressure conduits on the tractor. Fluid pressure is also supplied through conduit 3, gladhand connectors 4, 5, conduit 6, valve 7 and conduit 8 to the relay emergency valve 9 of the trailer system. Substantial delay occurs, however, between the arrival of fluid pressure in the tractor brake cylinders and in the trailer brake cylinders, as above described.

Movement of the potentiometer 30, however, produces, through amplifier 31 and conductor 20a, actuation of motor 20 which, through shaft 21, opens valve 16 to supply fluid pressure from source 10 through conduits 15, 17, valve 7 and conduit 8 to the relay emergency valve 9. Because of the rapid effect of the electrical transmission thus described, it will be realized that fluid pressure is thus supplied to the trailer brake system at a time much earlier than would be the case were the fluid pressure enroute through the service lines 3, 6 to be awaited.

This same rapid delivery of fluid pressure to the valve 9, and thus through valve 9 to the trailer brake chambers of the trailer system, is accomplished with the form of FIGURE 2 wherein the electrical energy supplied to solenoid 52 opens valve 50 to deliver fluid pressure through elements 17, 7 and 8 to valve 9.

The system of the invention provides a feedback and minute control of fluid pressure supplied to the trailer system in relation to that supplied through application valve 1. In the form of FIGURE 1, motor shaft 21 positions potentiometer 32 and pedal 2 on the tractor positions potentiometer 30. The positions of potentiometers 30, 32 are both fed to amplifier 31, the system providing means for eliminating minute variances between the energy called for by potentiometer 30 and that actually supplied to motor 20. Should the potentiometer 32 show a discrepancy therebetween, the motor 20 may be supplied with more or less electrical energy. Similarly, the employment of an incremental motor with valve 16 and the master-slave potentiometers 30, 32 and amplifier 31 will permit minute incremental movements of the motor and hence a fine adjustment of the valve 16.

Whereas the form of the invention of FIGURE 1, employing a servo or incremental motor 20, senses and feeds back to amplifier 31 in relation to the position of motor 20 or its shaft 21, the form of the invention in FIGURE 2 senses and feeds back a pressure parameter. The pressure supplied through conduit 8 to valve 9 is sensed by pressure-responsive member 53, the position of which is converted to electrical energy by a signal generator taking the form of field effect coil 54 and feed back to amplifier 31 through electrical conductors 54a. It will be realized that pressure-responsive member 53 could be suitably connected to a potentiometer such as that shown at 32, through field-effect coil 54 provides fully adequate sensitivity. Hence amplifier 31 may feed to solenoid 52 more or less electrical energy as may be required.

It will be understood also that the position of a control valve, such as the valve 16 or 15 for example, may be suitably read by attachment thereto of appropriate elements, such as potentiometer 32 for example.

In all events, the demand established by the positioning of potentiometer 30 in response to actuation of application valve 1 will be transmitted to the trailer brake system. If the pressure actually supplied to the system, in response to said demand, is not within precise, controlled limits, that fact, having been fed back to amplifier 31, will produce, in known manner, a variance in the electrical energy transmitted by amplifier 31 to the valve-positioning element to increase or decrease, as the case may be, the pressure applied to the trailer system.

Since the differential amplifier is employed in connection with the systems shown, it will be understood that the actuating mechanism for the valve between source 10 and valve 7 will be conrolled in relation to amperage differentials or signals, thus providing a further minuteness of control over the employment of voltage for said purpose, for example.

It will be noted that the service line conductive 3, 6, valve 7 and conduit 8 remain open to the trailer valve 9 at all times. Hence any failure in the electrical transmitting system or in the valve controlling delivery of fluid pressure from source 10 to valve 7 will not affect the basic service line system and trailer brakes will remain available to the trailer, albeit said trailer brakes would be applied after the application of tractor brakes in the normal manner.

The embodiments of the invention in which an exclusive property or privilege is claimed are defined as follows:

1. For use with a tractor-trailer vehicle having a brake system incorporating a brake application valve on the tractor and a source of fluid pressure and brake actuators on the trailer, a system including a first electrical signal generator movable in response to movement of said application valve, a control valve controlling delivery of fluid pressure from said source to said actuators, electrically activated means for moving said control valve, a second electrical signal generator movable in response to movement to said electrically activated means and a differential amplifier, said first and second signal generators and said means for moving said control valve being connected to said amplifier, whereby the electrical energy delivered from said amplifier to said last-named means shall correspond to that signaled by said first signal generator.

2. The structure of claim 1 wherein said first signal generator is mounted on the tractor and said second signal generator is mounted on the trailer.

3. The structure of claim 1 wherein said tractor-trailer vehicle brake system incorporates a service line communicating said application valve on the tractor with a two-way check valve on the trailer and the trailer system includes a relay valve betweeen said source and said actuators, and a conduit communicating said two-way check valve with said relay valve and wherein said control valve communicates with said source and with said two-way check valve whereby said two-way check valve may be alternately supplied with fluid pressure from said application valve and said control valve.

4. The structure of claim 1 wherein said first signal generator constitutes a potentiometer movable in response to movement of said application valve, said control valve moving means constitutes an electrically operable motor operatively engaging said control valve and said second signal generator constitutes a second potentiometer movable in response to movement of said motor.

5. In a tractor-trailer brake system having an application valve on the tractor and a source of fluid pressure on the trailer, a differential amplifier, a potentiometer movable in response to movement of said application valve and connected to said amplifier, a control valve controlling delivery of fluid pressure from said source, electrical means for operating said valve, said means being connected to said amplifier, a pressure-responsive signal generator communicating with fluid pressure from said source and connected to said amplifier.

6. The structure of claim 1 wherein said control valve moving means constitutes a solenoid operatively engaging said control valve.

7. The structure of claim 1 wherein said brake system includes a relay valve between said source and said actuators, a two-way check valve communicating with said relay valve and a service conduit communicating said application valve with said two-way check valve, said control valve communicating with said two-way check valve.

8. The structure of claim 1 wherein said control valve moving means constitutes an incremental motor operatively connected to said control valve and to said second signal generator.

9. In combination with a tractor brake system and a trailer brake system, a first electrical signal generator movable in response to delivery of fluid pressure to said tractor brake system, electrically operable means supplying fluid pressure to said trailer brake system in response to movement of said first signal generator, a second electrically operable signal generator movable in response to delivery of fluid pressure to said trailer brake system, and means responsive to differentials between the signals generated by said first and second signal generators for adjusting the electrical energy supplied to said electrically operable pressure supply means.

References Cited

UNITED STATES PATENTS

| | | | |
|---|---|---|---|
| 2,169,668 | 8/1939 | Thomas | 303—7 X |
| 3,423,135 | 1/1969 | Beltramo | 303—7 X |
| 3,428,369 | 2/1969 | Kobnick | 303—7 X |

MILTON BUCHLER, Primary Examiner

J. McLAUGHLIN, JR., Assistant Examiner

U.S. Cl. X. R.

188—3; 303—3, 15